United States Patent
Kim et al.

(10) Patent No.: US 7,820,291 B2
(45) Date of Patent: Oct. 26, 2010

(54) CORE-SHELL TYPE NANOPARTICLES COMPRISING METAL CORES AND CRYSTALLINE SHELLS OF METAL OXIDE OR METALLOID OXIDE

(75) Inventors: Sang Ho Kim, Daejeon (KR); Woo Ram Lee, Gimcheon-si (KR); Young Soo Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 184 days.

(21) Appl. No.: 11/633,475

(22) Filed: Dec. 5, 2006

(65) Prior Publication Data

US 2007/0128439 A1    Jun. 7, 2007

(30) Foreign Application Priority Data

Dec. 6, 2005    (KR) .............. 10-2005-0118346

(51) Int. Cl.
*B32B 5/16*    (2006.01)
(52) U.S. Cl. .............. 428/403; 428/404; 977/778; 977/810; 977/811
(58) Field of Classification Search ........ 428/403, 428/404; 977/778, 810, 811
See application file for complete search history.

(56) References Cited

U.S. PATENT DOCUMENTS

| 6,207,229 | B1 | 3/2001 | Bawendi et al. | |
|---|---|---|---|---|
| 6,322,901 | B1 * | 11/2001 | Bawendi et al. | 428/548 |
| 6,548,264 | B1 * | 4/2003 | Tan et al. | 435/7.21 |
| 6,565,973 | B2 * | 5/2003 | Duff et al. | 428/402 |
| 6,632,528 | B1 * | 10/2003 | Clough | 428/402 |
| 6,685,986 | B2 | 2/2004 | Oldenburg et al. | |
| 6,921,496 | B2 | 7/2005 | Anderson et al. | |
| 7,150,910 | B2 * | 12/2006 | Eisler et al. | 428/325 |
| 7,190,870 | B2 * | 3/2007 | Sundar et al. | 385/129 |
| 7,261,940 | B2 * | 8/2007 | Klimov et al. | 428/403 |

(Continued)

FOREIGN PATENT DOCUMENTS

| JP | 2003-064278 | 3/2003 |
|---|---|---|
| KR | 10-2002-0068223 A | 8/2002 |
| KR | 10-2005-0084212 A | 8/2005 |

OTHER PUBLICATIONS

Vertegel el al, "Epitaxial electrodeposition of thallic oxide on single crystal gold", Electrochimica Acta 45 (2000) 3233-3239.L.*

(Continued)

*Primary Examiner*—H. (Holly) T Le
(74) *Attorney, Agent, or Firm*—McKenna Long & Aldridge LLP

(57) ABSTRACT

Disclosed herein are core-shell type nanoparticles comprising nanoparticle cores made of a metal or semiconductor, and shells made of crystalline metal oxide formed on the surfaces of the nanoparticle cores, as well as a preparation method thereof. According to the disclosed invention, the core-shell nanoparticles, consisting of metallic or semiconductor cores and crystalline metal oxide shells, can be prepared by epitaxially growing metal oxide on the surfaces of the metallic or semiconductor nanoparticle cores. By virtue of the crystalline metal oxide shells, the core nanoparticle made of metal or semiconductor can ensure excellent chemical and mechanical stability, and the core-shell nanoparticles can show new properties resulting from the interaction between the metal cores and the metal oxide crystal shells.

4 Claims, 6 Drawing Sheets

U.S. PATENT DOCUMENTS

| | | | | |
|---|---|---|---|---|
| 7,288,468 | B2 * | 10/2007 | Jang et al. | 438/500 |
| 7,374,824 | B2 * | 5/2008 | Bawendi et al. | 428/570 |
| 7,381,465 | B2 * | 6/2008 | Torimoto et al. | 428/403 |
| 2003/0190475 | A1 | 10/2003 | Carpenter et al. | |
| 2005/0051769 | A1 | 3/2005 | Jang et al. | |
| 2005/0082521 | A1 * | 4/2005 | Torimoto et al. | 257/17 |
| 2006/0210636 | A1 * | 9/2006 | Nonninger et al. | 424/489 |

OTHER PUBLICATIONS

Liu et al, "Epitaxial Electrodeposition of Zinc Oxide Nanopillars on Single-Crystal Gold", Chem. Mater. (2001), 13, 508,512.*

Hofmeister, et al., Metal Nanoparticle Coating of Oxide Nanospheres for Core-Shell Stuructures, Part. Part. Syst. Charact. 19 (2002) 359-365.*

Joo et al., Thermally stable Pt/mesoporous silica core-shell nanocatalysts for high-temperature reactions, Nature Materials, vol. 8, Feb. 2009 (available online Nov. 23, 2008).*

Yong H. Han; "Characteristic optical properties and synthesis of gold-silica core-shell colloids"; (2006). Scripta Materialia. 55, pp. 1127-1129. Postprint available fee at: http://repositories.cdlib.org/postprints/1725.

Yin Yadong et al.; "Silver Nanowires Can Be Directly Coated with Amorphous Silica to Generate Well-Controlled Coaxial Nanocables of Silver/Silica"; Department of Materials Science and Engineering, Department of Chemistry, University of Washington, Seattle, Washington 98195; received Jan. 17, 2002; Revised Manuscript received Jan. 22, 2002; American Chemical Society; published on the web Feb. 2, 2002.

Ahmed Mohamed El-Toni, et al.; "Coating and photochemical properties of calcia-doped ceria with amorphous silica by a seeded polymerization technique"; Received Oct. 26, 2004,, Accepted Dec. 21, 2004; First published as an Advance Article on the web Jan. 26, 2005; DOI: 10.1039/b416459h; The Royal Society of Chemistry-2005; Journal of Material Chemistry; 2005.

S Tabatabaei, et al.; "Experimental study of the synthesis and characterization of silica nanoparticles via the sol-gel method"; Institute of Physics Publishing; Journal of Physics: Conference Series 26 (2006) 371-374; doi:10.1088/1742-6596/26/1/090; EMAG-NANO 05: Imaging, Analysis and Fabrication on the Nanoscale; 2006 IOP Publishing Ltd.

Tom et al., "Freely Dispersible Au@$TiO_2$, Au@$ZrO_2$, Ag@$TiO_2$, and Ag@$ZrO_2$ Core-Shell Nanoparticles: One-Step Synthesis, Characterization, Spectroscopy, and Optical Limiting Properties", Langmuir, vol. 19, 2003, pp. 3439-3445.

Nosaka et al., "Factors Governing the Initial Process of $TiO_2$ Photocatalysis Studied by Means of in-Situ Electron Spin Resonance Measurements", J. Phys. Chem., 102, pp. 10279-10283, 1998.

Shan et al., "The structure and character of CdSe nanocrystals capped ZnO layer for phase transfer from hexane to ethanol solution", Surface Science 582, pp. 61-68, 2005.

Oldfield et al., "Au@$SnO_2$ Core-Shell Nanocapacitors", Advanced Materials, vol. 12, No. 20, pp.1519-1522, 2000.

* cited by examiner

CORE-SHELL TYPE NANOPARTICLES COMPRISING METAL CORES AND CRYSTALLINE SHELLS OF METAL OXIDE OR METALLOID OXIDE

This application claims the benefit of the filing date of Korean Patent Application No. 2005-118346, filed on Dec. 6, 2005, in the Korean Intellectual Property Office, the disclosure of which is incorporated herein in its entirety by reference.

TECHNICAL FIELD

The present invention relates to core-shell type nanoparticles comprising nanoparticle cores made of a metal or semiconductor, and shells made of crystalline metal oxide formed on the surfaces of the nanoparticle cores, as well as a preparation method thereof.

BACKGROUND ART

Nanoparticles are particles having nanoscale particle sizes, and show optical, electrical and magnetic properties completely different from those of bulk materials due to large specific surface area and the quantum confinement effect, in which energy required for electron transfer changes depending on the size of material. Due to such properties, much interest has been concentrated on their applicability in the catalytic, electromagnetic, optical and medical fields. Since nanoparticles can be considered as intermediates between bulk materials and molecules, they can be synthesized using two approaches, i.e., the "top-down" approach and the "bottom-up" approach. The "top-down" approach is a method of breaking bulk material into small pieces, and has an advantage in that it is easy to control the size of nanoparticles, but a disadvantage in that it is difficult to make less than 50 nm of nanoparticles. For this reason, the "bottom-up" approach, i.e. a method of assembling atoms or molecules into nanoparticles, has recently received attention, and is mainly performed using colloidal synthesis starting from chemical molecular or atomic precursors.

With regard to the synthesis of metal nanoparticles, the synthesis of metal nanoparticles, including gold, silver, platinum, palladium, ruthenium, iron, copper, cobalt, cadmium, nickel and silicon, has been reported. However, because such metal nanoparticles are unstable by themselves, they aggregate with the passage of time and thus lose their nanoparticle properties. Thus, for the synthesis of nanoparticles, which are stable in solution and even after drying, a method capable of preventing these nanoparticles from aggregating together and a method capable of preventing the surface of the nanoparticles from being oxidized are required.

Meanwhile, core-shell type nanoparticles, which comprise nanoparticle as the core and another material coated on the surface of the core, are known in the art. In the core-shell type nanoparticles, the shell portion forms a chemical and mechanical protective layer for the core material, and the material of the core and the material of the shell provide multi-functionality while maintaining the inherent property of each thereof, or the two properties will interact with each other to show new properties. Thus, the core-shell type nanoparticles are applicable in various fields, including catalyst and photoelectric device fields. However, it is not easy to embody multi-layer structures at the nanoscale.

For example, such core-shell nanoparticles are used as precursors either for preparing hollow structures by completely removing the core material through chemical etching, combustion, photodissolution and the like, or for preparing a unique structure of materials by partially removing the core material. Also, there is an example in which $TiO_2$, $CeO_2$ or the like, having photocatalytic functionality, is used as the core material, and a metal such as Ag or Cu, having antibacterial activity, is coated on the surface of the core material. Other examples, in which a metal is used as the core material, and inorganic metal oxide is coated as the shell material, include a case in which $SiO_2$ is coated on magnetic material Ni to provide chemical and magnetic stabilities, and a case in which $SiO_2$ is coated on metal nanoparticles such as Au or Ag to provide chemical stability. Particularly, with regard to the case where $SiO_2$ is coated as the shell material, it is known to coat $SiO_2$ using, for example, TEOS (TetraEthyl OrthoSilicate), an organometallic compound of silicon, as a precursor, through a hydrolysis-condensation reaction. However, when this reaction is used to prepare the metal core-oxide shell nanoparticles, there are problems in that oxide coated on the surface of the core is amorphous in nature, and thus has reduced chemical and mechanical properties compared to crystalline oxide.

DISCLOSURE OF THE INVENTION

The present inventors have found that, when the reaction rate of metal oxide in coating the metal oxide on the surface of nanoparticles of a metal or semiconductor compound is controlled such that the metal oxide is epitaxially grown on the nanoparticle surface, a crystalline shell can be formed at room temperature within a short time.

Accordingly, it is an object of the present invention to provide core-shell type nanoparticles, comprising shells made of crystalline-metal oxide formed on the surfaces of nanoparticle cores made of a metal or semiconductor, as well as a preparation method thereof.

To achieve the above object, according to one aspect, the present invention provides core-shell type nanoparticles comprising: a) nanoparticle cores made of a material selected from the group consisting of the metals of Groups 3-15 of the periodic table, metalloids, lanthanide metals, actinide metals, alloys of two or more of said elements, and semiconductor compounds; and b) shells made of crystalline metal oxide formed on the surfaces of the nanoparticle cores.

According to another aspect, the present invention provides a method for preparing said core-shell type nanoparticles, the method comprising the steps of: a) dispersing, in a mixed solvent of water and a first organic solvent, nanoparticle cores made of a material selected from the group consisting of the metals of Groups 3-15 of the periodic table, metalloids, lanthanide metals, actinide metals, alloys of two or more of said elements, and semiconductor compounds; and b) dropping a metal oxide precursor dissolved in a second organic solvent into the solution prepared in step a), thereby forming core-shell type nanoparticles comprising shells made of crystalline metal oxide formed on the surfaces of the nanoparticle cores.

According to still another aspect, the present invention provides a method for preparing said core-shell type nanoparticles, the method comprising the steps of: a) dispersing nanoparticle cores made of a material selected from the group consisting of the metals of Groups 3-15 of the periodic table, metalloids, lanthanide metals, actinide metals, alloys of two or more of said elements, and semiconductor compounds, and dissolving a metal oxide precursor in a first organic solvent; and b) dropping a mixed solvent of water and a second organic solvent into the solution prepared in step a), thereby forming core-shell type nanoparticles comprising shells made of crystalline metal oxide formed on the surfaces of the nanoparticle cores.

Hereinafter, the present invention will be described in further detail.

In this description, the terminology of "metal oxide" includes oxide of metalloid element as well as oxide of metal element of Groups 3-15 of the periodic table.

Nanoparticles, which can be used as the cores in the present invention, can be made of a material selected from the group consisting of the metals of Groups 3-15 of the periodic table, metalloids, lanthanide metals, actinide metals, alloys of two or more of said elements, and semiconductor compounds. Non-limiting examples of this material include Au, Ag, Pt, Pd, Co, Ni, Fe, alloys of two or more of said elements, CdSe, ZnS, and CdS. The nanoparticles which are used in the present invention can be prepared according to any conventional method known to those skilled in the art, and the preparation method thereof is not specifically limited. The metallic or semiconductor nanoparticles usable as the cores in the present invention have a crystal structure, and thus, those on which shells can be epitaxially grown are considered equivalents of the nanoparticles in the present invention.

The size of the nanoparticles, which are used in the present invention, can be 3-200 nm, and preferably 50-150 nm, but is not necessarily limited thereto.

The shells coated on the surfaces of the cores in the present invention may be made of metal oxide, and non-limiting examples of this metal oxide include $SiO_2$, $ZrO_2$, $TiO_2$, ZnO, $SnO_2$ and the like.

As described in a preparation method below, metal oxide that can form the shells can be synthesized as a solution phase from a precursor of metal oxide, and thus, those that can form crystalline metal oxide at room temperature or low temperature without any additional thermal treatment are all considered equivalents of the metal oxide in the present invention.

The thickness of the shells formed on the surfaces of the cores can be 3-50 nm, and preferably 10-25 nm, but is not necessarily limited thereto. This shell thickness can be achieved using a preparation method disclosed in the present invention.

The shells formed on the surfaces of the cores in the present invention are characterized in that they are crystalline in nature, but are not amorphous. Such crystalline metal oxide shells can be obtained by epitaxially growing metal oxide on the surfaces of the metallic or semiconductor nanoparticles according to a preparation method to be described below, and such crystalline growth can be achieved at room temperature within a relatively short time. Crystalline metal oxide shells, which can be prepared according to the inventive method, can have a brookite, rutile or anatase structure for $TiO_2$, and a quartz, crystobalite or tridymite structure for $SiO_2$, but are not necessarily limited thereto, and any metal oxide structure can be formed for the shells in the present invention as long as it has a crystalline structure. As disclosed in an embodiment of the present invention, when $TiO_2$ is coated on Ag nanoparticles, a rutile structure of $TiO_2$ can be formed. Such crystalline metal oxide shells have advantages in that they have excellent chemical durability and mechanical strength compared to amorphous shells, and thus can effectively protect the cores from various factors capable of influencing the properties of the cores, thus effectively preserving optical properties or electrical properties. Also, new properties resulting from the interaction between the core material and the shell material can be expected.

Meanwhile, a method according to the prior art has problems in that a high-temperature heat treatment process should necessarily be carried out in order to form crystalline shells, and the properties of the cores and the shells can be changed during the heat treatment process. However, according to the inventive preparation method, because the reaction is completed at room temperature, a separate heat treatment process does not need to be carried out, thus preventing the above-mentioned problems from occurring.

The inventive core-shell type nanoparticles comprising the shells made of crystalline metal oxide formed on the surfaces of the nanoparticle cores made of a metal or semiconductor can be prepared according to any one of the following two methods.

Method (1):

A method of adding water to a nanoparticle core dispersion and then dropping a solution of a metal oxide precursor into the dispersion.

Method (2):

A method of dropping water into a solution comprising both nanoparticle cores and a metal oxide precursor.

Method (1) may comprise the steps of:

a) dispersing, in a mixed solvent of water and a first organic solvent, nanoparticle cores made of a material selected from the group consisting of the metals of Groups 3-15 of the periodic table, metalloids, lanthanide metals, actinide metals, alloys of two or more of said elements, and semiconductor compounds; and b) dropping a metal oxide precursor dissolved in a second organic solvent into the solution prepared in step a), thereby forming core-shell type nanoparticles comprising shells made of crystalline metal oxide formed on the surfaces of the nanoparticle cores.

Method (2) may comprise the steps of:

a) dispersing nanoparticle cores made of a material selected from the group consisting of the metals of Groups 3-15 of the periodic table, metalloids, lanthanide metals, actinide metals, alloys of two or more of said elements, and semiconductor compounds, and dissolving a metal oxide precursor in a first organic solvent; and b) dropping a mixed solvent of water and a second organic solvent into the solution prepared in step a), thereby forming core-shell type nanoparticles comprising shells made of crystalline metal oxide formed on the surfaces of the nanoparticle cores.

The first and second methods may additionally comprise a step of separating nanoparticles from the core-shell type nanoparticle dispersion obtained in step b).

Method (1) will now be described.

Step a) is a step in which nanosizod cores made of a noble metal, transition metal or semiconductor material, which were previously prepared according to a known method, are dispersed in a mixed solvent of water and a first organic solvent. Herein, the first organic solvent acts to control the hydrolysis rate of the metal oxide precursor. For example, when only water is used without using the first solvent mixture, the hydrolysis rate of the metal oxide precursor in step b) will be too high, so that the metal oxide shells will not be uniformly coated on the core surfaces, and the metal oxide particles can be aggregated to form larger particles. For this reason, it is preferable to use the mixed solvent of water and the first organic solvent for the formation of the inventive core-shell nanoparticles in order to reduce the concentration of water used in the hydrolysis. Also, in order to form crystalline shells by epitaxial growth of the metal oxide shells on the surfaces of the metal nanoparticle cores, it is preferable to control the hydrolysis rate of metal oxide precursor so as not to become too high.

The first organic solvent, which is used in the present invention, may be selected from among alcohols, amides and nitriles. Non-limiting specific examples of the first organic solvent include isopropyl alcohol, ethanol, DMF (dimethyl formamide) and the like, and the mixing ratio between water and the first organic solvent is preferably 1:3 to 1:10000.

Meanwhile, the metal oxide precursor is dissolved in a second organic solvent, and the solution is dropped slowly into the core nanoparticle dispersion prepared in step a). One typical example of the metal oxide precursor is a metal alkoxide represented by M-(OR)$_n$, wherein M is a metal element, R is an alkyl group having 1-10 carbon atoms, and n is an oxidation number of M. The alkoxide M(OR)n, an organometallic compound, reacts with X—OH according to Reaction Scheme 1 below. This reaction depends on the property of X.

[Reaction Scheme 1]

(1) when X=H, the following hydrolysis occurs:

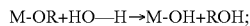

(2) when X=M, the following condensation occurs:

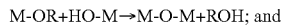

(3) when X=R', the following chemical modification occurs:

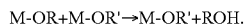

Although the formation of metal oxide shells is performed by the hydrolysis and condensation of the metal alkoxide as described above, the metal oxide precursor is not necessarily limited only to the metal alkoxide, and metal carboxylate, metal halide or the like can also be used as the metal oxide precursor.

The second organic solvent, which is used in the present invention, may be selected from among alcohols, amides and nitrites, which can dissolve the metal oxide precursor, and non-limiting examples thereof include isopropyl alcohol, ethanol, DMF and the like.

In order to embody the crystalline metal oxide shells as the characteristics of the present invention, the metal oxide cells should be epitaxially grown from the surfaces of the metal nanoparticle cores. Particularly, the present invention is characterized in that such epitaxial growth can be achieved at room temperature within a relatively short time. This is thought to be because the primarily synthesized seed nanoparticles act as nucleation sites, so that the crystalline shells are formed on the seed surfaces from the metal oxide precursor which is slowly dropped.

In the present invention, the hydrolysis reaction for causing the epitaxial growth of the crystalline metal oxide shells can occur at room temperature, and preferably at a temperature of 5-40° C.

For the epitaxial growth, the hydrolysis rate needs to be as low as possible, and for this purpose, it is required to control the mixing ratio between the water and the first organic solvent in step a) or control the dropping rate of the metal oxide precursor in step b). Although the volume ratio of water to the mixed solvent of water and the first organic solvent is advantageously as low as possible, it is preferably about 1:3 to 1:10000. Also, although the dropping rate in step b) is advantageously as low as possible, it is preferable for the present invention to drop the metal oxide precursor at a rate of 5 µl/sec to 1 Ml/sec per 100 mg of the nanoparticle cores.

Moreover, the entire hydrolysis reaction is preferably completed within 1-60 minutes in view of economic efficiency, etc.

The reason why the dropping rate is low as described above is for the epitaxial growth of the metal oxide shell, and also to allow the shells to be uniformly formed on the core surfaces by preventing the metal oxide nanoparticles from being produced separately from the core material or preventing the shells from being non-uniformly aggregated on the core surfaces.

Also, in the present invention, an additive capable of controlling reaction rate can be additionally added during step a) or b). As the additive capable of controlling reaction rate, carboxylic acid or β-diketone can be used, and a chelating agent such as acetylacetone is preferably used. When such an additive is added, it can be chelated to the metal oxide precursor to reduce the hydrolysis rate of the precursor, thus controlling the coating rate of the shells.

In step b), after the metal oxide precursor is hydrolyzed, the metal oxide is uniformly coated on the surfaces of the metal nanoparticle cores, so that a dispersion containing the core-shell nanoparticles comprising the crystalline metal oxide shells can be obtained. To obtain dry core-shell nanoparticles, nanoparticles can be separated from the dispersion according to methods known to those skilled in the art, including spray drying, freeze drying, precipitation/filtration, and centrifugation.

Method (2) is the same as Method (1) with the basic principle and the type and amount of materials used, except for the following differences. In Method (1), water is used in step a), the solution of the metal oxide precursor dissolved in the second organic solvent is dropped into the dispersion of the cores in step b), and the volume ratio between water and the first organic solvent is controlled in order to control the hydrolysis rate of the metal oxide precursor.

In Method (2) in comparison with Method (1), the metal oxide precursor is used instead of water in step a), the mixed solvent of water and the second organic solvent is dropped into the dispersion of the cores in step b), and the volume ratio between water and the second organic solvent is controlled in order to control the hydrolysis rate of the metal oxide precursor.

Accordingly, Method (1) and Method (2) are performed according to the same reaction principle, except that the addition order of water and the metal oxide precursor is different between the two methods.

MODE FOR CARRYING OUT THE INVENTION

Hereinafter, the present invention will be described in further detail with reference to examples. It is to be understood, however, that these examples are illustrative only and are not to be construed to limit the scope of the present invention.

Figure 1:
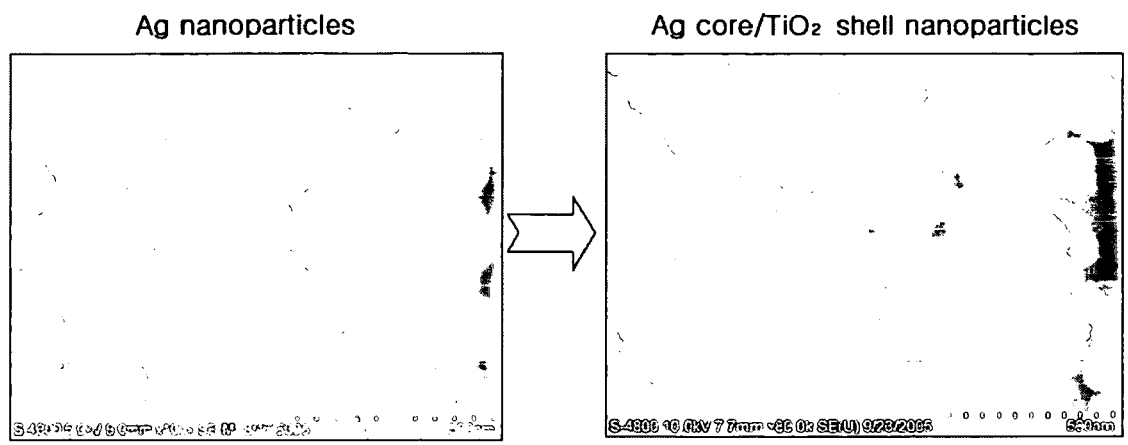
FIG. 1 shows a scanning electron microscope (SEM) photograph of core particles having no shells formed thereon (left side), and a scanning electron microscope photograph of core-shell particles, which have shells formed according to Example 1 (right side).
Figure 2:
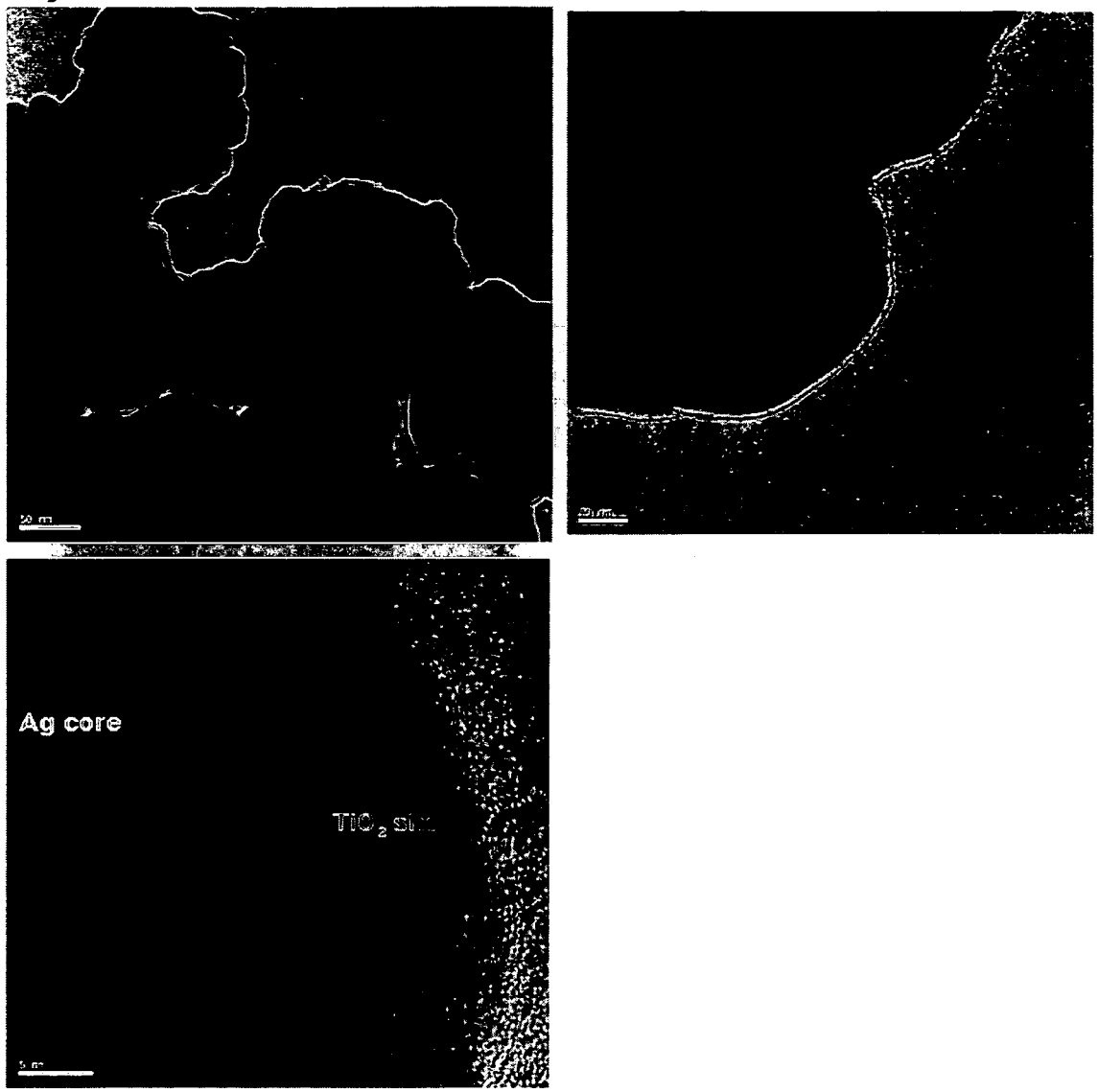
FIG. 2 is a transmission electron microscope photograph (TEM) of core-shell type nanoparticles synthesized according to the method of Example 1.
Figure 4:
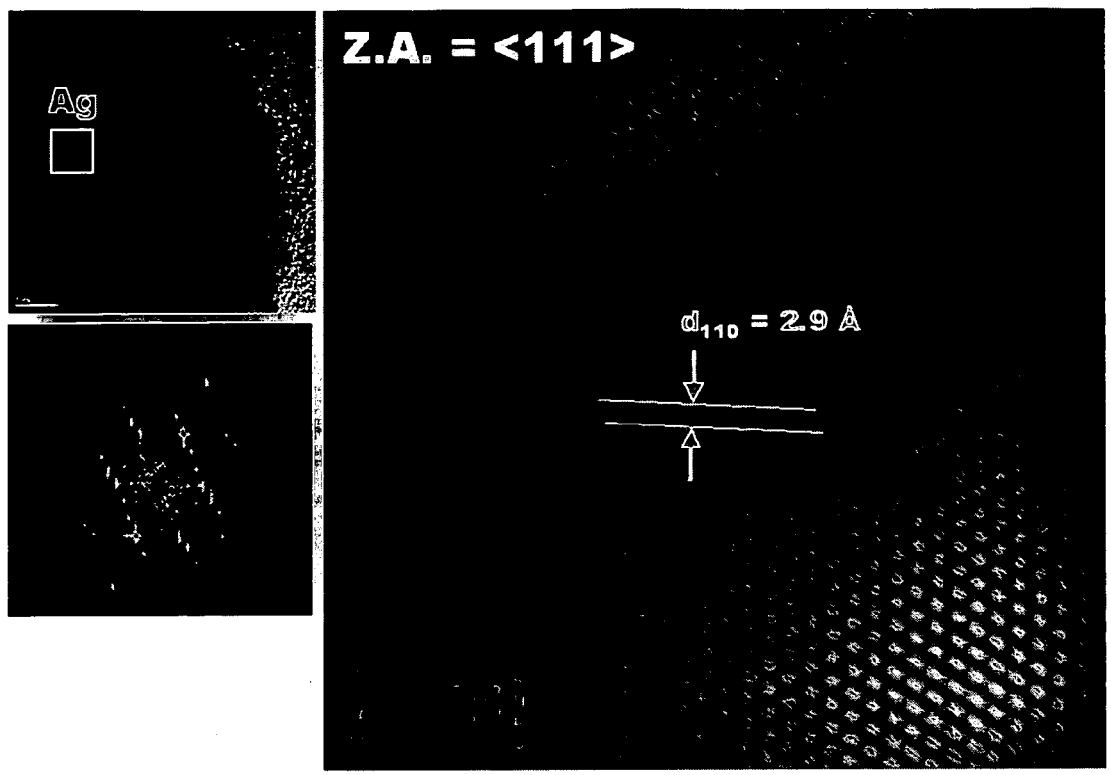
FIG. 4 shows HRTEM (high resolution transmission electron microscope) analysis results for the crystallinity of the Ag core portion of core-shell type nanoparticles synthesized according to the method of Example 1.
Figure 5:
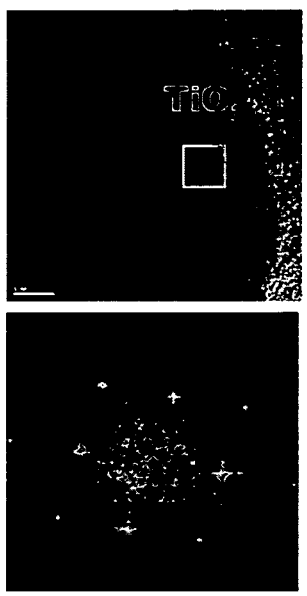
FIG. 5 shows HRTEM (high resolution transmission electron microscope) analysis results for the crystallinity of the $TiO_2$ shell portion of core-shell type nanoparticles synthesized according to the method of Example 1.
Figure 5:
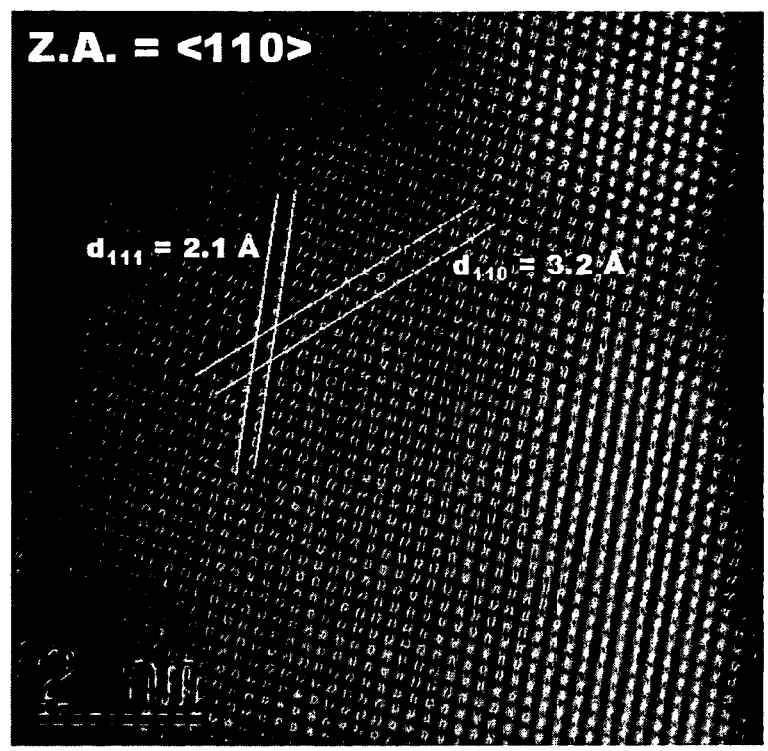
Figure 6:
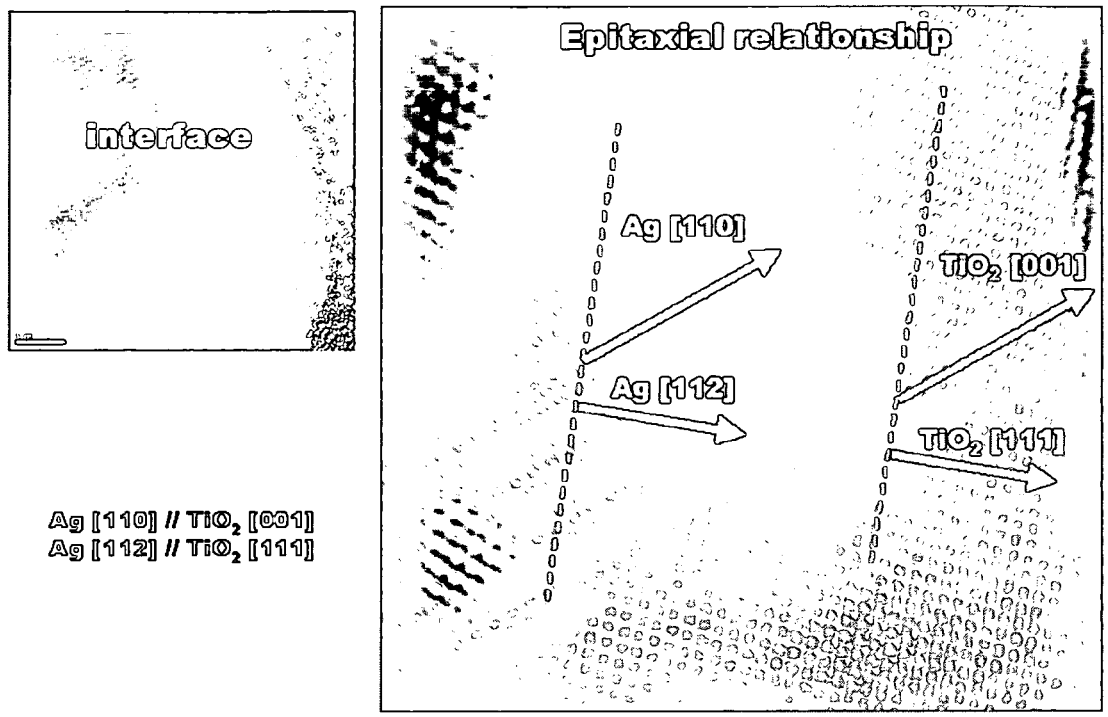
FIG. 6 shows HRTEM analysis results for the crystallinity of the core-shell boundary of core-shell nanoparticles synthesized according to the method of Example 1.

Example 1 a) 30 mg of silver (Ag) nanoparticles having a mean diameter ($d_{50}$) of 100 nm were well dispersed by stirring in a mixed solvent of 5 ml of distilled water and 15 ml of isopropyl alcohol to make a dispersion of cores. b) 6 μl of titanium isopropoxide was dissolved in a mixed solvent of 2 μl of acetylacetone and 10 ml of isopropyl alcohol to make a solution. Then, the solution prepared in step b) was dropped slowly into the core dispersion prepared in step a), at a rate of 5 μl/sec. At the end of the dropping, the hydrolysis of the titanium isopropoxide was completed (after about 35 minutes). Toluene was added into the resulting dispersion of core-shell nanoparticles, and the solution was centrifuged to collect core-cell nanoparticles. The microstructure of the synthesized core-shell nanoparticles was observed with SEM and TEM, and the observation results are shown in FIGS. 1 and 2. Meanwhile, as can be seen in FIG. 4, the left side of a TEM photograph at the bottom of FIG. 2 was a core portion made of an Ag metal crystal, and as can be seen in FIG. 5 showing the results of HRTEM analysis of crystallinity, $TiO_2$ forming the shells had a rutile structure. Also, as can be seen in FIG. 6, the $TiO_2$ shells were crystals epitaxially grown from the surfaces of the Ag cores.

Figure 3:
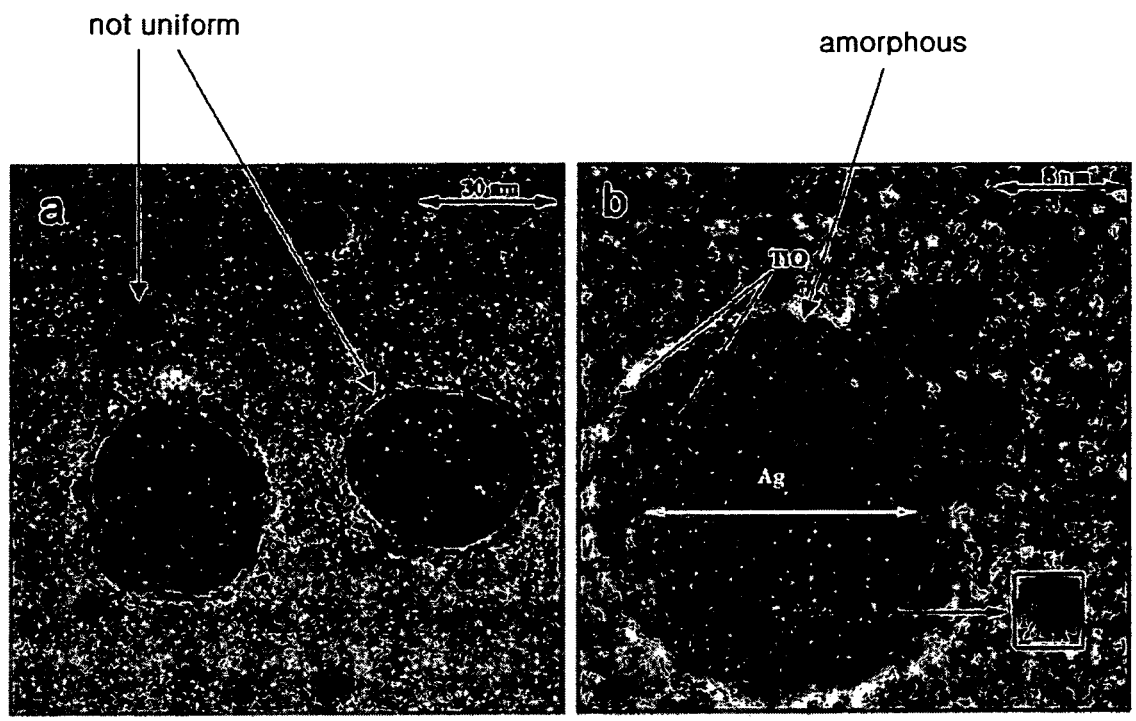
FIG. 3 is a TEM photograph of core-shell type nanoparticles synthesized according to the method of Comparative Example 1.

Comparative Example 1 a) Distilled water was added to 3.8 mM DMF and 0.8 M silver nitrate ($AgNO_3$) to make a total volume of 5 ml. b) 5.75 mM $Ti(OC_4H_9)_4$ and 5.75 mM acetylacetone were added to ethanol to make a total volume of 20 ml. c) The solutions prepared in steps a) and b) were combined with each other, and then refluxed with stirring for 90 minutes, and the resulting dispersion was washed with toluene and centrifuged to obtain core-shell nanoparticles. The synthesized core-shell nanoparticles were analyzed using SEM and TEM, and the analysis results are shown in FIG. 3. As can be seen in FIG. 3, the $TiO_2$ shells were non-uniformly coated on the Ag cores or were aggregated separately from the cores.

INDUSTRIAL APPLICABILITY

As can be seen from the foregoing, according to the present invention, the core-shell nanoparticles consisting of metallic or semiconductor cores and crystalline metal oxide shells, can be prepared by epitaxially growing metal oxide on the surfaces of the metallic or semiconductor nanoparticle cores. Because the metal oxide shells are formed in a crystalline phase, the inventive core-shell nanoparticles can ensure excellent chemical and mechanical stability compared to the prior core-shell nanoparticles having amorphous metal oxide shells, and can show new properties resulting from the interaction between the metal cores and the metal oxide crystal shells.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:
1. Core-shell type nanoparticles comprising:
   a) nanoparticle cores made of a material selected from the group consisting of Au, Ag, Pt, Pd, and alloys of two or more of said metals; and
   b) shells made of crystalline metal oxide or metalloid oxide formed by an epitaxial crystal growth at a temperature of 5-40° C. on the surfaces of the nanoparticle cores.
2. The core-shell type nanoparticles according to claim 1, wherein the shells are made of a material selected from the group consisting of $SiO_2$, $ZrO_2$, $TiO_2$, ZnO, and $SnO_2$.
3. The core-shell type nanoparticles according to claim 1, wherein the nanoparticle cores have a mean diameter of 3-200 nm.
4. The core-shell type nanoparticles according to claim 1, wherein the shells have a thickness of 3-50 nm.

* * * * *